US010110476B2

(12) United States Patent
Caldwell et al.

(10) Patent No.: US 10,110,476 B2
(45) Date of Patent: Oct. 23, 2018

(54) ADDRESS SHARING

(71) Applicant: METASWITCH NETWORKS LTD., Enfield (GB)

(72) Inventors: Andrew Munro Caldwell, London (GB); Matthew Ian Ronald Williams, London (GB)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

(21) Appl. No.: 15/491,241

(22) Filed: Apr. 19, 2017

(65) Prior Publication Data
US 2017/0310580 A1 Oct. 26, 2017

(51) Int. Cl.
*H04L 12/703* (2013.01)
*H04L 12/715* (2013.01)
*H04L 12/741* (2013.01)
*H04L 12/751* (2013.01)
*H04L 29/12* (2006.01)

(52) U.S. Cl.
CPC .............. *H04L 45/28* (2013.01); *H04L 45/02* (2013.01); *H04L 45/64* (2013.01); *H04L 45/74* (2013.01); *H04L 61/103* (2013.01)

(58) Field of Classification Search
CPC ......... H04L 45/28; H04L 45/02; H04L 45/64; H04L 45/74; H04L 61/103
See application file for complete search history.

(56) References Cited

U.S. PATENT DOCUMENTS

| 8,243,589 | B1 | 8/2012 | Trost et al. | |
| 2004/0010583 | A1* | 1/2004 | Yu | H04L 45/00 709/224 |
| 2009/0257341 | A1 | 10/2009 | Labaume | |
| 2011/0283013 | A1* | 11/2011 | Grosser | H04L 61/103 709/232 |
| 2013/0159487 | A1* | 6/2013 | Patel | H04L 67/1031 709/223 |

* cited by examiner

*Primary Examiner* — Luat Phung
(74) *Attorney, Agent, or Firm* — EIP US LLP

(57) ABSTRACT

A plurality of network nodes are configured to form a virtual logical network over a plurality of broadcast domains. Configuring the virtual logical network includes configuring at least one of the nodes in the plurality of nodes to broadcast routes to IP addresses hosted on nodes in the plurality of network nodes between nodes in the plurality of broadcast domains. A primary workload hosted on a first node in the plurality of nodes is configured to share ownership of an IP address with a secondary workload hosted on a second node in the plurality of nodes. In response to detecting a failure indication associated with the primary workload, an IP address failover procedure for the shared IP address is performed between the primary workload and the secondary workload.

31 Claims, 5 Drawing Sheets

ADDRESS SHARING

CROSS-REFERENCE TO RELATED APPLICATIONS

This application claims priority under 35 U.S.C. § 119(a) to UK patent application no. GB 1606980.9, filed on Apr. 21, 2016, the entire content of which is hereby incorporated by reference.

BACKGROUND OF THE INVENTION

Field of the Invention

The present disclosure relates to address sharing. In particular, but not exclusively, the present disclosure relates to shared ownership of IP addresses in a network comprising a plurality of network nodes located in a plurality of broadcast domains.

Description of the Related Technology

It may be desirable to allow two machines in a virtual network to share a single virtual Internet Protocol (VIP) address (for example two of Metaswitch™'s Perimeta™ signaling session controller (SSC) nodes sharing a signaling address) and to indicate which of the two nodes should be actively servicing the address by sending gratuitous address resolution protocol (ARP) messages at switchover-time (and to subsequently respond to ARP requests for that IP address). It may be desirable to have the machines exist as (potentially virtualized) hosts that may be running in separate physical networks, separated by (potentially multiple) routers some of which may be public Internet backbone routers.

For example, say that the machines are all in the 10.0.0.0/8 virtual network and the network operator owns 8.8.8.0/24 as public addresses which it uses as publicly routable VIPs. A known, naive approach involves setting up a Layer 2 virtual local area network (VLAN) between the sites, which has various issues.

A first issue with such a known approach is that it requires inter-site security, for example using dedicated links or a virtual private network (VPN) between sites; the former is expensive, and the latter is likely to require IPsec(IP(Ether)) to tunnel the IP packets around.

A second issue with such a known approach is that it must be fully Layer 2 compliant such that broadcast rules have to be conformed with; carrying broadcast packets to/from other sites, can be very expensive in terms of bandwidth.

A third issue with such a known approach is that there is no connection between the externally visible Layer 3 routing and the internal Layer 2 routing, so this can often result in having to pass packets between the sites from the 'outside world' after they arrive at the wrong site.

SUMMARY

According to embodiments, there is a method for use in a network comprising a plurality of network nodes located in a plurality of broadcast domains, the method comprising:

configuring the plurality of network nodes to form a virtual logical network over the plurality of broadcast domains, wherein the configuring the virtual logical network comprises configuring at least one of the nodes in the plurality of nodes to broadcast routes to Internet Protocol (IP) addresses hosted on nodes in the plurality of network nodes between nodes in the plurality of broadcast domains;

configuring a primary workload hosted on a first node in the plurality of nodes to share ownership of an IP address with a secondary workload hosted on a second node in the plurality of nodes, wherein the first node is located in a first broadcast domain in the plurality of broadcast domains and the second node is located in a second broadcast domain in the plurality of broadcast domains, the second broadcast domain being different from the first broadcast domain; and in response to detecting a failure indication associated with the primary workload, performing an IP address failover procedure for the shared IP address between the primary workload and the secondary workload.

According to embodiments, there is a system for use in a network comprising a plurality of network nodes located in a plurality of broadcast domains, the system comprising at least one memory including computer program code; and at least one processor in data communication with the at least one memory, wherein the at least one processor is configured to:

configure the plurality of network nodes to form a virtual logical network over the plurality of broadcast domains, wherein the configuring the virtual logical network comprises configuring at least one of the nodes in the plurality of nodes to broadcast routes to Internet Protocol (IP) addresses hosted on nodes in the plurality of network nodes between nodes in the plurality of broadcast domains;

configure a primary workload hosted on a first node in the plurality of nodes to share ownership of an IP address with a secondary workload hosted on a second node in the plurality of nodes, wherein the first node is located in a first broadcast domain in the plurality of broadcast domains and the second node is located in a second broadcast domain in the plurality of broadcast domains, the second broadcast domain being different from the first broadcast domain; and in response to detecting a failure indication associated with the primary workload, perform an IP address failover procedure for the shared IP address between the primary workload and the secondary workload.

According to embodiments, there is a non-transitory computer-readable storage medium comprising computer-executable instructions which, when executed by a processor, cause a computing device to perform a method for use in a network comprising a plurality of network nodes located in a plurality of broadcast domains, the method comprising:

configuring the plurality of network nodes to form a virtual logical network over the plurality of broadcast domains, wherein the configuring the virtual logical network comprises configuring at least one of the nodes in the plurality of nodes to broadcast routes to Internet Protocol (IP) addresses hosted on nodes in the plurality of network nodes between nodes in the plurality of broadcast domains;

configuring a primary workload hosted on a first node in the plurality of nodes to share ownership of an IP address with a secondary workload hosted on a second node in the plurality of nodes, wherein the first node is located in a first broadcast domain in the plurality of broadcast domains and the second node is located in a second broadcast domain in the plurality of broadcast domains, the second broadcast domain being different from the first broadcast domain; and in response to detecting a failure indication associated with the primary workload, performing an IP address failover procedure for the shared IP address between the primary workload and the secondary workload.

According to embodiments, there is a method for use in a network comprising a plurality of network nodes located in a plurality of broadcast domains, the method comprising:

configuring the plurality of network nodes to form a virtual Layer 3 subnet over the plurality of broadcast domains, wherein the configuring the virtual Layer 3 subnet comprises configuring at least one of the nodes in the plurality of nodes to broadcast routes to Internet Protocol (IP) addresses hosted on nodes in the plurality of network nodes between nodes in the plurality of broadcast domains using a Border Gateway Protocol (BGP) route announce mechanism;

configuring a primary virtual machine hosted on a first node in the plurality of nodes to share ownership of a virtual IP address with a secondary virtual machine hosted on a second node in the plurality of nodes, wherein the first node is located in a first broadcast domain in the plurality of broadcast domains and the second node is located in a second broadcast domain in the plurality of broadcast domains, the second broadcast domain being different from the first broadcast domain; and in response to detecting a failure indication associated with the primary virtual machine, performing an IP address failover procedure for the shared virtual IP address between the primary virtual machine and the secondary virtual machine.

According to embodiments, there is a method for use in a network comprising a plurality of network nodes located in a plurality of broadcast domains, the method comprising:

configuring the plurality of network nodes to form a virtual logical network over the plurality of broadcast domains, wherein the configuring the virtual logical network comprises configuring at least one of the nodes in the plurality of nodes to broadcast routes to Internet Protocol (IP) addresses hosted on nodes in the plurality of network nodes between nodes in the plurality of broadcast domains;

configuring a primary workload hosted on a first node in the plurality of nodes to share ownership of an IP address with a secondary workload hosted on a second node in the plurality of nodes, wherein the first node is located in a first broadcast domain in the plurality of broadcast domains and the second node is located in a second broadcast domain in the plurality of broadcast domains, the second broadcast domain being different from the first broadcast domain; and in response to detecting a failure indication associated with the primary workload, performing an IP address failover procedure for the shared IP address between the primary workload and the secondary workload, wherein performing the IP address failover procedure comprises:

the secondary workload indicating to the second node that the shared IP address can be reached at the secondary workload;

the second node broadcasting to the virtual logical network that it hosts a route to the shared IP address; and the first node broadcasting to the virtual logical network that it no longer hosts a route to the shared IP address.

Further features of the present disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
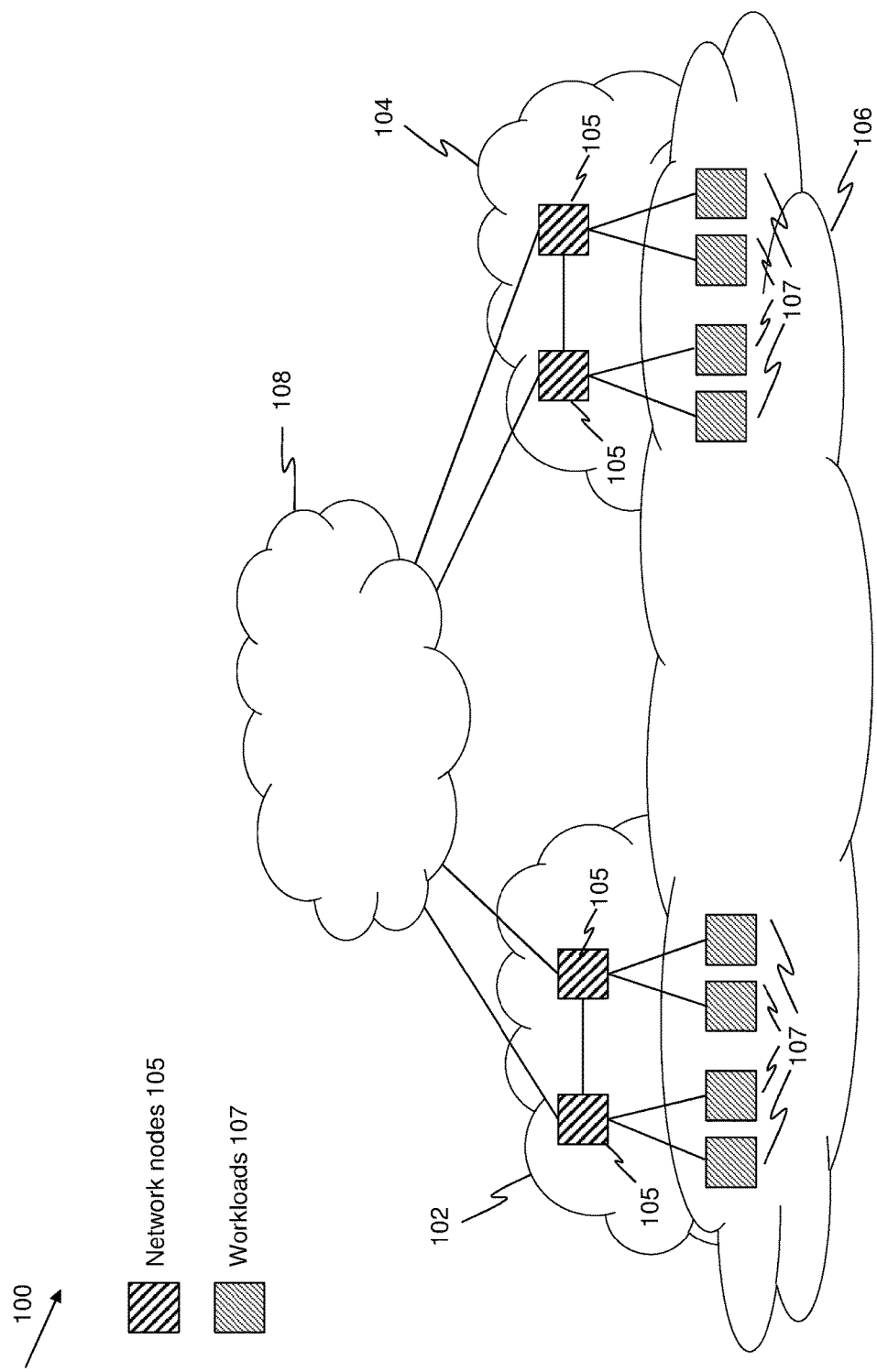
FIG. 1 shows a system diagram according to embodiments.

FIG. 1 shows a system diagram of a network 100 according to embodiments. Network 100 comprises a plurality of network nodes 105 located in a plurality of broadcast domains. A broadcast domain (or 'switching domain') is a plurality of network nodes which share the same route broadcast mechanism(s). Different broadcast domains may comprise different physical sites, but not necessarily; some or all of the nodes in different broadcast domains may be located on the same physical site, but have different route broadcast mechanisms.

In the example network 100 shown in FIG. 1, the plurality of broadcast domains comprises a broadcast domain 102 and broadcast domains 104. In some examples, broadcast domain 102 comprises a physical site which is remote from a physical site of broadcast domain 104, in this example being separated by a further network 108. Network 108 may comprise any connecting or trunking network, for example the public Internet.

The nodes in the plurality of network nodes 105 may for example comprise network switches, virtualization hosts, servers, service nodes, routers, etc. and may be collectively referred to as a cloud of network nodes. The nodes in a first broadcast domain may be said to form a first cloud (or 'first switching domain') and the nodes in a second broadcast domain may be said to form a second cloud (or 'second switching domain'). In embodiments, nodes in a first broadcast domain may be said to form a first Layer 2 network and nodes in a second broadcast domain may be said to form a second Layer 2 network.

Network nodes 105 host a plurality of workloads 107, which may for example comprise one or more guests, virtual machines, containers, bare metal servers, service endpoints, etc. Workloads 107 may provide redundancy to failure in the form of primary (or 'active') and secondary (or 'standby') workloads, where, in the event of failure of a primary workload, failover to a secondary workload can be performed.

Embodiments comprise measures, including, methods, apparatus and computer programs, for use in a network 100 comprising a plurality of network nodes 105 located in a plurality of broadcast domains 102, 104. The plurality of network nodes 105 is configured to form a virtual logical network 106 over the plurality of broadcast domains. Configuring the virtual logical network comprises configuring at least one of the nodes 105 in the plurality of nodes to broadcast routes to IP addresses hosted on nodes in the plurality of network nodes between nodes in the plurality of broadcast domains.

A primary workload hosted on a first node in the plurality of nodes is configured to share ownership of an IP address with a secondary workload hosted on a second node in the plurality of nodes. The first node is located in a first broadcast domain in the plurality of broadcast domains and the second node is located in a second broadcast domain in the plurality of broadcast domains. The second broadcast domain is different from the first broadcast domain. In response to detecting a failure indication associated with the primary workload, an IP address failover procedure for the shared IP address is performed between the primary workload and the secondary workload.

Embodiments allow routes to IP addresses to be published between different broadcast/switching domains (or 'clouds'), despite these domains being in physically disparate locations.

Figure 2:
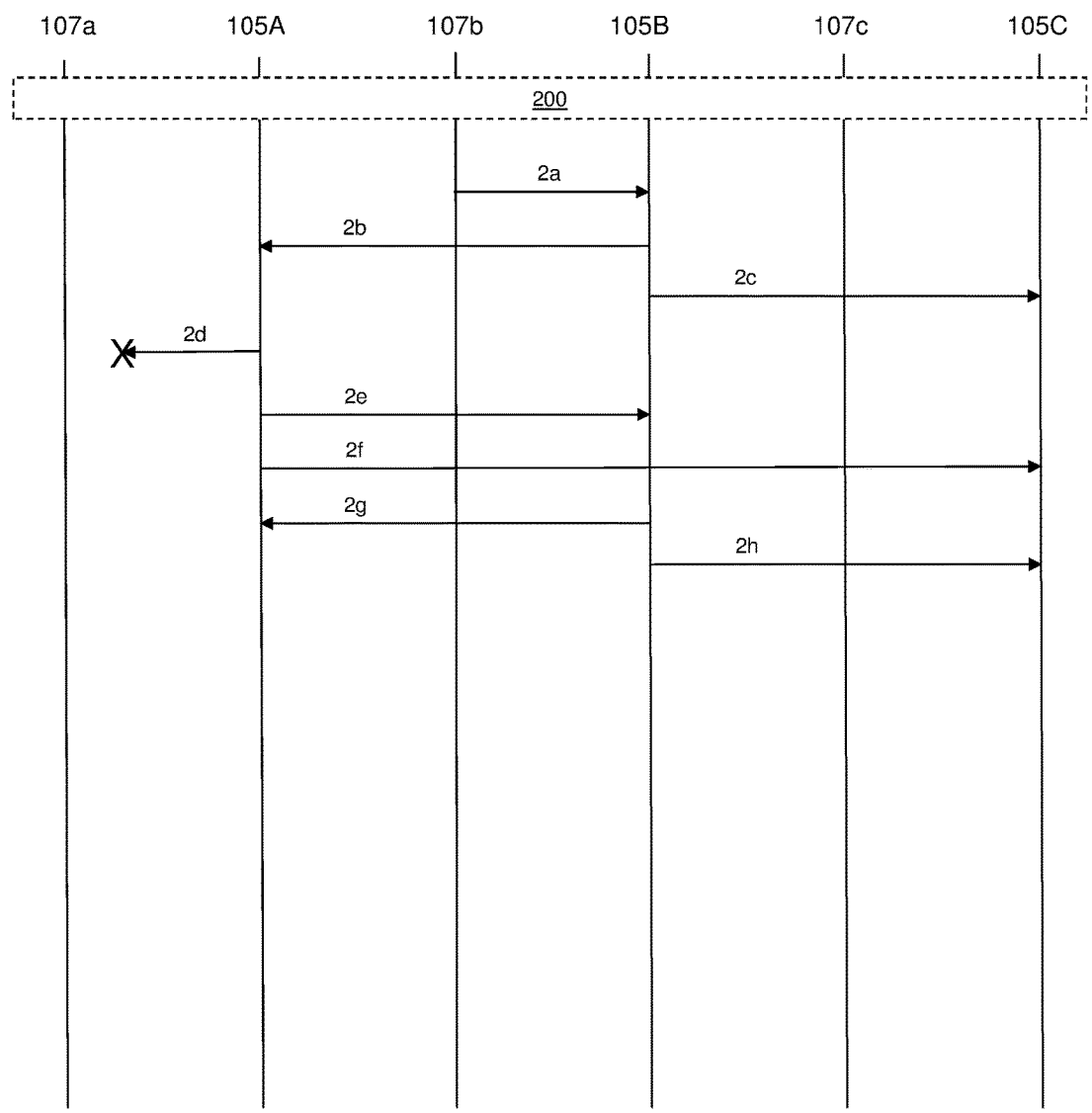
FIG. 2 shows a message flow diagram according to embodiments.

FIG. 2 shows a message flow diagram according to embodiments. In the example embodiments of FIG. 2, the plurality of network nodes 105 comprises network nodes 105A, 105B and 105C and virtual logical network 106 includes workloads 107a, 107b and 107c. At least one of nodes 105A, 105B and 105C is configured to broadcast routes to IP addresses hosted on nodes in the plurality of network nodes between nodes in the plurality of broadcast domains. Workload 107a is hosted on node 105A, workload 107b is hosted on node 105B and workload 107c is hosted on node 105C. At least workload 107a and workload 107b are in different broadcast domains (for example broadcast domains 102 and 104 respectively) of network 100.

As indicated by item 200 in FIG. 2, the IP address is initially held by workload 107a hosted on node 105A such that workload 107a is a primary workload and 107b is a secondary workload. Primary workload 107a hosted on node 105A is configured to share ownership of an IP address with secondary workload 107b hosted on node 105B. Workload 107a then fails and workload 107b detects this failure.

In response to detecting a failure indication associated with primary workload 107a, an IP address failover procedure for the shared IP address is performed between primary workload 107a and secondary workload 107b.

In embodiments, performing the IP address failover procedure comprises secondary workload 107b indicating to node 105B that the IP address can be reached at secondary workload 107b, as shown by step 2a. Node 105B then broadcasts to the virtual logical network that it hosts a route to the IP address, as shown by steps 2b and 2c where nodes 105A and 105C are notified respectively. Other nodes (not shown) in the plurality of nodes would be similarly notified.

In embodiments, performing the IP address failover procedure comprises node 105A broadcasting to the virtual logical network that it no longer hosts a route to the IP address, as shown by steps 2e and 2f where nodes 105B and 105C are notified respectively.

In embodiments, performing the IP address failover procedure comprises node 105A attempting to contact the primary workload, as shown in step 2d; in such embodiments, node 105 broadcasting to the virtual logical network that it no longer hosts a route to the IP address is performed in response to the contact attempt by node 105A of step 2d failing to receive a response from primary workload 107a.

In embodiments, prior to the detection of a failure indication associated with primary workload 107a, node 105A broadcasts (not shown) to the virtual logical network that it hosts a route to the IP address at a first route cost. In such embodiments, node 105B broadcasting to the virtual logical network (in steps 2b and 2c) that it hosts a route to the IP address comprises node 105B broadcasting to the virtual logical network that it hosts a route to the IP address at a second route cost, where the second route cost is lower than the first route cost.

In embodiments, performing the IP address failover procedure comprises, in response to node 105A broadcasting to the virtual logical network (in steps 2e and 2f) that it no longer hosts a route to the IP address, node 105B broadcasting an update to the virtual logical network in relation to the IP address, as shown by steps 2g and 2h where nodes 105A and 105C are notified respectively. In such embodiments, the updated broadcast indicates that node 105B hosts a route to the IP address at the first route cost.

Figure 3:
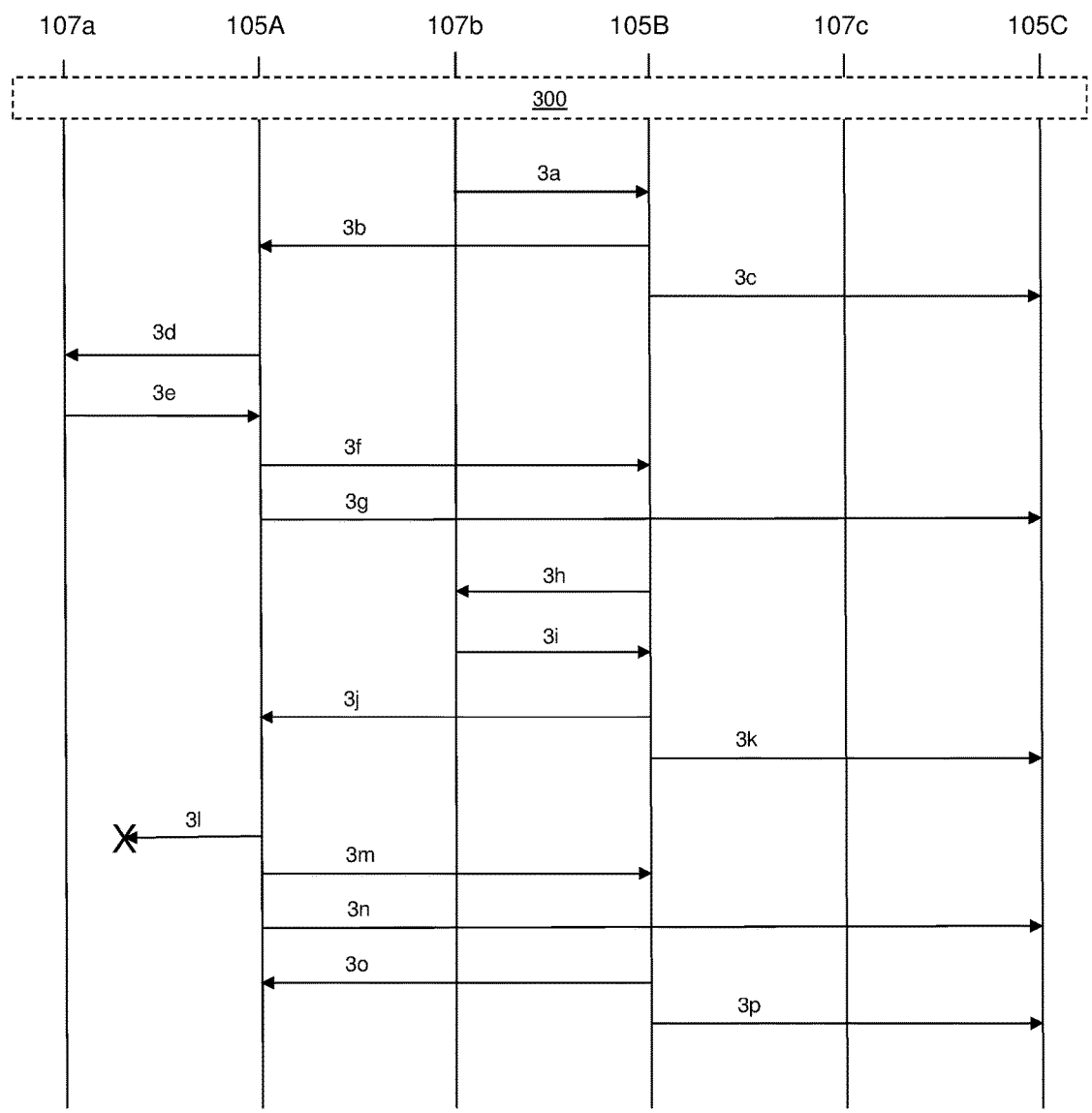
FIG. 3 shows a message flow diagram according to embodiments.

FIG. 3 shows a message flow diagram according to embodiments. FIG. 3 contains some elements in common with FIG. 2 which are similarly labelled. The embodiments of FIG. 3 can be referred to as 'slow resolve' embodiments.

As indicated by item 300 in FIG. 3, the IP address is initially held by workload 107a hosted on node 105A such that workload 107a is a primary workload and 107b is a secondary workload. Primary workload 107a hosted on node 105A is configured to share ownership of an IP address with secondary workload 107b hosted on node 105B. Workload 107a then fails and workload 107b detects this failure. In these embodiments, 107b wants to take over the IP address; however, workload 107a is slow to relinquish ownership and the IP address failover procedure therefore takes into account this slow relinquishing.

In response to detecting a failure indication associated with primary workload 107a, an IP address failover procedure for the shared IP address is performed between primary workload 107a and secondary workload 107b.

In embodiments, performing the IP address failover procedure comprises secondary workload 107b indicating to node 105B that the IP address can be reached at secondary workload 107b, as shown by step 3a. Node 105B then broadcasts to the virtual logical network that it hosts a route to the IP address, as shown by steps 3b and 3c where nodes 105A and 105C are notified respectively.

In embodiments, performing the IP address failover procedure comprises node 105A attempting to contact primary workload 107a, as shown by step 3d. In these embodiments the contact attempt to primary workload 107a succeeds and, in response to the contact attempt from node 105A, primary workload 107a indicates to node 105A that the IP address can be reached at primary workload 107a, as shown by step 3e. Node 105A then broadcasts to the virtual logical network that it hosts a route to the IP address, as shown by steps 3f and 3g where nodes 105B and 105C are notified respectively.

In embodiments, prior to the detection of a failure indication associated with primary workload 107a, node 105A broadcasts to the virtual logical network that it hosts a route to the IP address at a first route cost. In such embodiments, node 105B broadcasting to the virtual logical network (in steps 3b and 3c) that it hosts a route to the IP address comprises node 105B broadcasting to the virtual logical network that it hosts a route to the IP address at a second route cost, the second route cost being lower than the first route cost.

In embodiments, node 105A broadcasting to the virtual logical network (in steps 3f and 3g) that it hosts a route to the IP address after the detection of a success indication associated with primary workload 107a comprises node 105A broadcasting to the virtual logical network that it hosts a route to the IP address at a third route cost, the third route cost being lower than the second route cost.

In embodiments, performing the IP address failover procedure comprises node 105B attempting to contact the secondary workload, as shown by step 3h. In these embodiments the contact attempt to secondary workload 107b succeeds, and in response to the contact attempt from node 105B, secondary workload 107b indicates to node 105B that the IP address can be reached at secondary workload 107b, as shown by step 3i. Node 105B then broadcasts to the virtual logical network that it hosts a route to the IP address at a fourth route cost, as shown by steps 3j and 3k where nodes 105A and 105C are notified respectively. The fourth route cost is lower than the third route cost.

In embodiments, performing the IP address failover procedure comprises node 105A broadcasting to the virtual logical network that it no longer hosts a route to the IP address, as shown by steps 3m and 3n where nodes 105B and 105C are notified respectively.

In embodiments, performing the IP address failover procedure comprises node 105A further attempting to contact primary workload 107a, as shown by step 3l; in such embodiments, node 105A broadcasting to the virtual logical network that it no longer hosts a route to the IP address is performed in response to the further contact attempt of step 3l by node 105A failing to receive a response from primary workload 107a.

In embodiments, performing the IP address failover procedure comprises the node 105A further attempting to contact primary workload 107a; in some such embodiments, node 105A broadcasting to the virtual logical network that it no longer hosts a route to the IP address is performed in response to the further contact attempt by node 105A receiving a negative response from primary workload 107a.

In embodiments, performing the IP address failover procedure comprises, in response to node 105A broadcasting to the virtual logical network (in steps 3m and 3n) that it no longer hosts a route to the IP address, node 105B broadcasting an update to the virtual logical network in relation to the IP address. In such embodiments, the updated broadcast indicates that node 105B hosts a route to the IP address at the first route cost.

Figure 4:
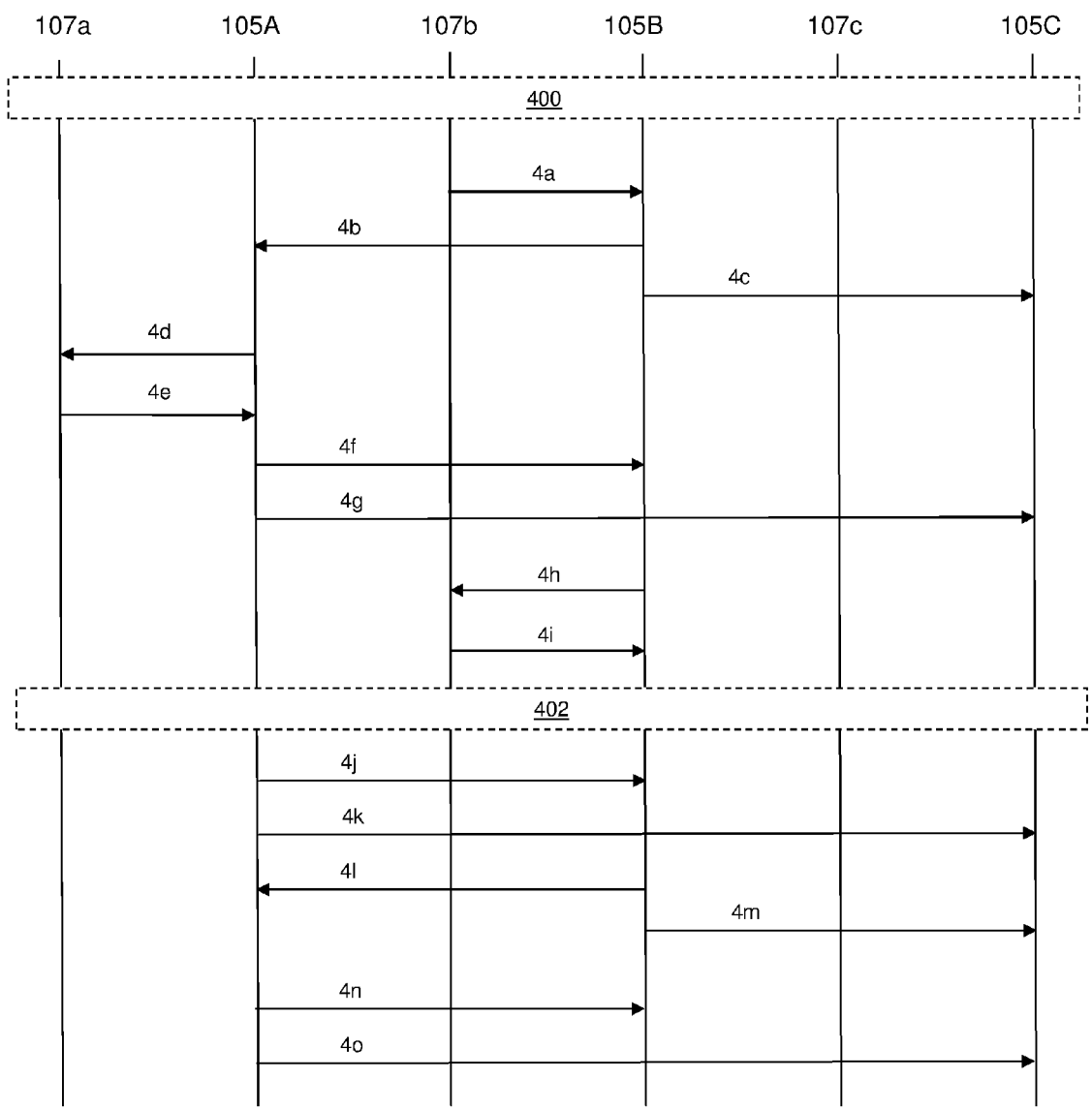
FIG. 4 shows a message flow diagram according to embodiments.

FIG. 4 shows a message flow diagram according to embodiments. FIG. 4 contains some elements in common with FIGS. 2 and 3 which are similarly labelled. The embodiments of FIG. 4 can be referred to as 'failed resolve' embodiments.

As indicated by item 400 in FIG. 4, the IP address is initially held by workload 107a hosted on node 105A such that workload 107a is a primary workload and 107b is a secondary workload. Primary workload 107a hosted on node 105A is configured to share ownership of an IP address with secondary workload 107b hosted on node 105B. In these embodiments, secondary workload 107b spuriously tries to take over the IP address.

In response to detecting a failure indication associated with primary workload 107a, an IP address failover procedure for the shared IP address is performed between primary workload 107a and secondary workload 107b.

In embodiments, performing the IP address failover procedure comprises secondary workload 107b indicating to node 105B that the IP address can be reached at secondary workload 107b, as shown by step 4a. Node 105B then broadcasts to the virtual logical network that it hosts a route to the IP address, as shown by steps 4b and 4c where nodes 105A and 105C are notified respectively.

In embodiments, performing the IP address failover procedure comprises node 105A attempting to contact primary workload 107a, as shown by step 4d. In these embodiments the contact attempt to primary workload 107a succeeds and, in response to the contact attempt from node 105A, primary workload 107a indicates to node 105A that the IP address can be reached at primary workload 107a, as shown by step 4e. Node 105A then broadcasts to the virtual logical network that it hosts a route to the IP address, as shown by steps 4f and 4g where nodes 105B and 105C are notified respectively.

In embodiments, performing the IP address failover procedure comprises node 105B attempting to contact secondary workload 107b, as shown by step 4h. In these embodiments the contact attempt to secondary workload 107b succeeds, and in response to the contact attempt from node 105B, secondary workload 107b indicates to node 105B that the IP address can be reached at secondary workload 107b, as shown by step 4i.

Item 402 of Figures indicates one or more iterations of primary workload 107a and secondary workload 107b via nodes 105A and 105B respectively vying for ownership of the IP address. This entails each of the two workloads being advertised at successively lower route costs until a predetermined minimum route cost is reached, as will now be described.

In embodiments, node 105A broadcasting to the virtual logical network that it hosts a route to the IP address after the detection of a failure indication associated with the primary workload comprises node 105A broadcasting to the virtual logical network that it hosts a route to the IP address at a predetermined minimum route cost, as shown by steps 4j and 4k where nodes 105B and 105C are notified respectively In embodiments, performing the IP address failover procedure comprises, in response to node 105A broadcasting to the virtual logical network that it hosts a route to the IP address at the predetermined minimum route cost, node 105B broadcasting to the virtual logical network that it no longer hosts a route to the IP address, as shown steps 4l and 4m where nodes 105A and 105C are notified respectively In embodiments, performing the IP address failover procedure comprises, in response to node 105B broadcasting to the virtual logical network that it no longer hosts a route to the IP address, node 105A broadcasting an update to the virtual logical network in relation to the IP address. In such embodiments, the updated broadcast indicates that node 105B hosts a route to the IP address at the first route cost.

In embodiments, the predetermined minimum route cost comprises a zero route cost.

In embodiments, the configured virtual logical network comprises a virtual Layer 3 subnet.

In some embodiments, the shared IP address comprises a virtual IP address.

In embodiments, primary workload 107a and secondary workload 107b comprise one or more of virtual machines, bare metal servers, containers, and service endpoints.

In embodiments, the detection of a failure indication associated with the primary workload is detected via one or more of the Address Resolution Protocol (ARP), gratuitous ARP messaging (GARP), Internet Control Message Protocol (ICMP) ping, Hypertext Transfer Protocol (HTTP) ping, a virtualization watchdog, a liveness Application Program Interface (API), and a Session Initiation Protocol (SIP) OPTIONS poll.

ARP/GARP has historically been a way in which nodes claim IP addresses in IP networks, so "legacy" software that uses this mechanism requires minimal changes to work in a virtual network that spans multiple sites/clouds/hosts according to embodiments.

Some embodiments are now described which employ ARP/GARP in a virtual IP address failover procedure of embodiments.

In such embodiments, two workloads share an example VIP address 8.8.8.1, each hosted on a separate host network node (say A and B). There are other host network nodes (including node C) in the deployment (or external to the deployment) too. Initially only one node has gratuitously ARPed that IP address and that node or one or more other nodes has broadcast the route to the IP address around the network so other workloads can reach it. The route is advertised from the local host as being (say) of route cost 8.

The primary workload (on A) fails and the secondary workload (on B) detects this though a failure detection mechanism; the secondary workload sends a gratuitous ARP for the VIP address.

This gratuitous ARP is seen by the local network node which broadcasts a route for that address to the other network nodes of route cost 7. The local network node also starts responding to ARPs from its own workloads for the VIP, pointing them at the secondary workload.

Network node C see this new route and starts to route packets to the new host node B (and hence to the secondary workload).

Network node A also sees this new route but, before switching over to it, it performs an ARP request locally to see if the primary workload is still alive (for example because the primary workload status has become unsynchronized).

If there is no response from the primary workload, node A takes the new route and publishes it as usual and publicly deletes its old route.

However, if node A's ARP to the primary workload is successful and the primary guest is still alive and vying for the VIP, then node A re-publishes its route for the VIP with a route cost of 7 (or one less than any other route it has seen from elsewhere).

Possibly, the first ARP was rogue and when node B now sees this route update, its local ARP request will fail and the network will stabilize on using node A again.

Possibly, node B will succeed, lower its route cost and re-publish and this time A's workload might have finished shutting down and no longer respond to the ARP request from node A, similarly stabilizing the decision.

If the route cost reaches 0 (or some other predetermined minimum route cost), that route wins, and the 'losing' node publishes a delete (or 'revoke') for its route to the VIP and starts using the route of the 'winning' node. Such embodiments help to prevent 'flapping' where ownership of a route is claimed back and forth between different locations.

Once one of the network nodes sees that all the other nodes have agreed on it as the route to use (it holds the only remaining route to the VIP), it re-publishes the route at cost 8 to allow re-failover at a later stage.

The route costs of 8, 7 and 0 in the above embodiments are given purely as example route costs and other route costs may be employed.

In embodiments, at least one of the routes to an IP address hosted by a node in the plurality of network nodes is broadcast between the plurality of broadcast domains using the Border Gateway Protocol (BGP).

In embodiments, at least one of the routes to an IP address hosted by a node in the plurality of network nodes is broadcast between the plurality of broadcast domains using a cloud management Application Program Interface (API). In some such embodiments, the cloud management API comprises the Amazon™ Elastic Compute Cloud (EC2) web service virtual IP address control API.

In embodiments, node 105A or node 105B broadcasting to the virtual logical network that it hosts a route to the IP address comprises node 105A or node 105B broadcasting to the virtual logical network using a Border Gateway Protocol (BGP) route announce mechanism.

In embodiments, node 105A or node 105B broadcasting to the virtual logical network that it no longer hosts a route to the IP address comprises node 105A or node 105B broadcasting to the virtual logical network using a Border Gateway Protocol (BGP) route revoke mechanism.

Figure 5:
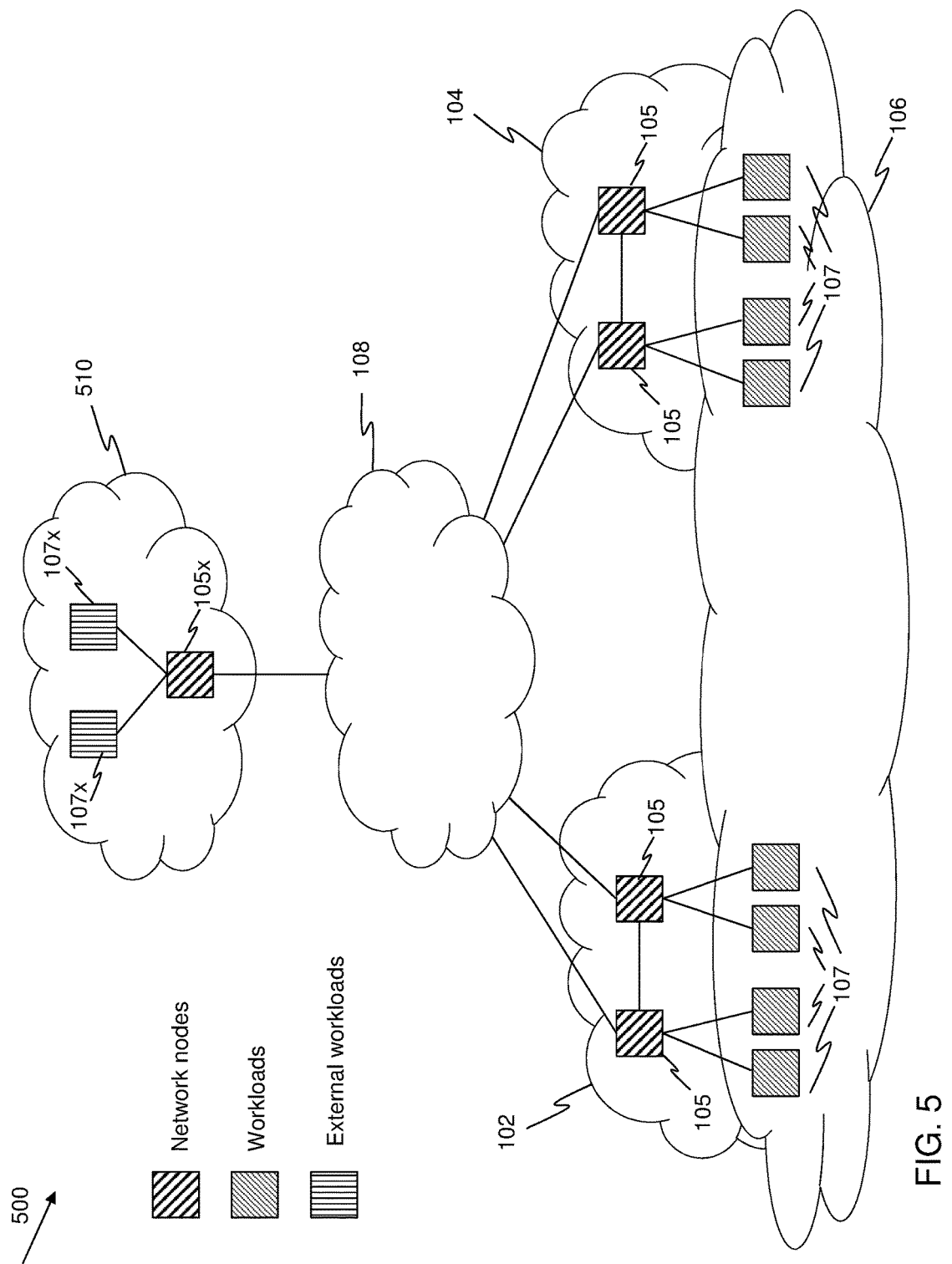
FIG. 5 shows a system diagram according to embodiments.

FIG. 5 shows a system diagram of a network 500 according to embodiments. FIG. 5 contains some elements in common with FIG. 1 which are similarly labelled. FIG. 5 also contains a network 510 which is external to virtual logical network 106. External network 510 comprises one or more network nodes 105x which host a plurality of workloads 107x.

In some virtual network setups, the networking layer is configured with a static NAT translation that maps a publicly addressable IP address to a workload in the virtual network.

Embodiments enable two (or more) workloads to share an IP address in an external network (for example a public IP in the public Internet) in such a static NAT environment by using the public IP address to private IP address mapping model for the NAT configuration. In such embodiments, network nodes 105 perform static NAT and the node that is in the broadcast domain of the workload that currently claims the private IP address publishes itself as the route to the external address. If the private address is claimed by another workload, then, after the private IP address has settled on its new owner, the network node in the new owner's broadcast domain publishes the route to the external address (replacing the route that the previous network node published). Thus, packets being sent by external devices to the shared public IP address will be routed to the correct broadcast domain (and hence to the correct workload).

In embodiments, the public IP address announcement is not made until the private IP address handover is completed, since any flapping of addresses in the public Internet can lead to the route being suppressed and the public IP address becoming unreachable. Until this happens, packets may arrive at the old broadcast domain (for example because they followed an old BGP route) and the old broadcast domain forwards the packets to the new one (for example using IP in IP tunneling).

In embodiments, the shared IP address comprises a private IP address; such embodiments comprise, at one of node 105A and node 105B, performing a static network address translation (NAT) to map the private IP address to an IP address in an external network, and broadcasting to the virtual logical network that the one of node 105A and node 105B hosts a route to the IP address in the external network. Here, the private IP address may for example be a private IP address for a workload 107 and the NAT mapping may for example be carried out by a node 105.

Embodiments comprise, at the one of node 105A and node 105B, delaying the broadcasting to the external network that the one of node 105A and node 105B hosts a route to the IP address in the external network until the IP address failover procedure has completed.

In embodiments, the external network comprises the public Internet and the IP address in the external network comprises a public IP address.

Embodiments comprise, during the IP address failover procedure, at the one of node 105A and node 105B, forwarding packets to the other of node 105A and node 105B. In some such embodiments, the packets are forwarded using IP to IP tunneling.

In embodiments, network nodes of embodiments may distribute BGP routes (say for example a 10.0.0.0/8 network) between the nodes in different broadcast domains (which may be spread over multiple physical sites) over IP in IP tunnels. This means that new nodes can claim new addresses in the 10.0.0.0/8 network and all other nodes in the virtual network can reach the new node. Employing this functionality with IP address ownership failover procedure functionality and static NAT functionality according to embodiments means that the new nodes can also claim the publicly visible VIP and have the external BGP routes update automatically to indicate that the address has moved between the two broadcast domains and allowing external host nodes to efficiently reach the new VIP owner.

Embodiments described above involve distribution of routes between nodes in different broadcast domains.

In some cases, this distribution of routes may involve the routes being distributed between the broadcast domains only via nodes (routers, switches, gateways, etc.) which have a common affiliation, for example all nodes are part of the same affiliated domain (or same 'autonomous system'). In such cases, some of the involved nodes may be part of an external network, but that external network has a common affiliation with nodes in the local (i.e. non-external) network(s). In such cases, all nodes are managed by a single entity and share a common routing policy to the Internet such that the above described static NAT functionality need not be employed.

In some cases, this distribution of routes may involve the routes being distributed between the broadcast domains via at least one node which does not have a common affiliation, for example at least one node is part of a different affiliated domain/autonomous system. In some such cases, some of the involved nodes may be part of an external network which does not have a common affiliation with nodes in the local (i.e. non-external) network(s). In such cases, at least two nodes are managed by different entities which may have different routing policies to the Internet such that the above described static NAT functionality can be employed.

Embodiments comprise measures, including, methods, apparatus and computer programs, for use in a network comprising a plurality of network nodes located in a plurality of physical sites; an example such method comprises:

configuring the plurality of network nodes to form a virtual Layer 3 subnet over the plurality of physical sites, wherein the configuring the virtual Layer 3 subnet comprises configuring at least one of the nodes in the plurality of nodes to broadcast routes to Internet Protocol (IP) addresses hosted on nodes in the plurality of network nodes between nodes in the plurality of physical sites using a Border Gateway Protocol (BGP) route announce mechanism;

configuring a primary virtual machine hosted on a first node in the plurality of nodes to share ownership of a virtual IP address with a secondary virtual machine hosted on a second node in the plurality of nodes, wherein the first node is located in a first physical site in the plurality of physical sites and the second node is located in a second physical site in the plurality of physical sites, the second physical site being different from the first physical site; and in response to detecting a failure indication associated with the primary virtual machine, performing an IP address failover procedure for the shared virtual IP address between the primary virtual machine and the secondary virtual machine.

In alternative embodiments, instead of employing a BGP route announce mechanism, any other announce mechanism and/or routing protocol may be employed, for example Open Shortest Path First (OSPF), Routing Information Protocol (RIP), etc.

Embodiments comprise measures, including, methods, apparatus and computer programs, for use in a network comprising a plurality of network nodes located in a plurality of physical sites; an example such method comprises:

configuring the plurality of network nodes to form a virtual logical network over the plurality of physical sites, wherein the configuring the virtual logical network comprises configuring at least one of the nodes in the plurality of nodes to broadcast routes to Internet Protocol (IP) addresses hosted on nodes in the plurality of network nodes between nodes in the plurality of physical sites;

configuring a primary workload hosted on a first node in the plurality of nodes to share ownership of an IP address with a secondary workload hosted on a second node in the plurality of nodes, wherein the first node is located in a first physical site in the plurality of physical sites and the second node is located in a second physical site in the plurality of physical sites, the second physical site being different from the first physical site; and in response to detecting a failure indication associated with the primary workload, performing an IP address failover procedure for the shared IP address between the primary workload and the secondary workload, wherein performing the IP address failover procedure comprises:

the secondary workload indicating to the second node that the shared IP address can be reached at the secondary workload;

the second node broadcasting to the virtual logical network that it hosts a route to the shared IP address; and the first node broadcasting to the virtual logical network that it no longer hosts a route to the shared IP address.

One or more of the aspects of the embodiments described herein with reference to the drawings comprise processes performed by one or more entities such as network nodes, switches, servers, etc. In embodiments, the one or more entities comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to above may comprise any suitable storage medium, including solid-state drives (SSD) or other semiconductor-based RAM; a ROM, for example a CD ROM or a semiconductor ROM; or a magnetic recording medium, for example a floppy disk or hard disk.

The term 'Layer 2' used herein refers to the data link layer of the Open Systems Interconnection (OSI) model. The term 'Layer 3' used herein refers to the network layer of the OSI model.

The above embodiments are to be understood as illustrative examples of the present disclosure. Further embodiments are envisaged.

In some embodiments described herein, workloads in a virtual network are virtual machine (VM) guests running in nodes configured as virtualization hosts. Other embodiments do not employ a virtualization layer, but instead have nodes in each physical site which implement a virtual network.

In embodiments described above, physical site 102 is connected to physical site 104 by network 108; in other embodiments, physical site 102 borders physical site 104 without another network (such as network 108) being located between them.

Some embodiments above describe use of the ARP which relates to an Internet Protocol version 4 (IPv4) environment. Embodiments can equally be applied using the Neighbor Discover Protocol (NDP) in an Internet Protocol version 6 (IPv6) environment. Embodiments could also be applied using a combination of ARP and NDP.

Embodiments are described above in the context of sharing IP addresses; embodiments can equally be applied to sharing of addresses other that IP addresses.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method for use in a network comprising a plurality of network nodes located in a plurality of broadcast domains, the method comprising:
    configuring the plurality of network nodes to form a virtual logical network over the plurality of broadcast domains, wherein the configuring the virtual logical network comprises configuring at least one of the nodes in the plurality of nodes to broadcast routes to Internet Protocol (IP) addresses hosted on nodes in the plurality of network nodes between nodes in the plurality of broadcast domains, wherein the configured virtual logical network comprises a virtual Layer 3 subnet;
    configuring a primary workload hosted on a first node in the plurality of nodes to share ownership of a virtual IP address with a secondary workload hosted on a second node in the plurality of nodes, wherein the first node is located in a first broadcast domain in the plurality of broadcast domains and the second node is located in a second broadcast domain in the plurality of broadcast domains, the second broadcast domain being different from the first broadcast domain; and
    in response to detecting a failure indication associated with the primary workload, performing an IP address failover procedure for the shared virtual IP address between the primary workload and the secondary workload.

2. The method of claim 1, wherein performing the IP address failover procedure comprises:
    the secondary workload indicating to the second node that the virtual IP address can be reached at the secondary workload; and
    the second node broadcasting to the virtual logical network that the second node hosts a route to the virtual IP address.

3. The method of claim 2, comprising, prior to the detection of a failure indication associated with the primary workload, the first node broadcasting to the virtual logical network that the first node hosts a route to the virtual IP address at a first route cost,
    wherein the second node broadcasting to the virtual logical network that the second node hosts a route to the virtual IP address comprises the second node broadcasting to the virtual logical network that the second node hosts a route to the virtual IP address at a second route cost, the second route cost being lower than the first route cost.

4. The method of claim 2, wherein the first or second node broadcasting to the virtual logical network that the first or second node hosts a route to the virtual IP address comprises the first or second node broadcasting to the virtual logical network using a Border Gateway Protocol (BGP) route announce mechanism.

5. The method of claim 3, wherein the first node broadcasting to the virtual logical network that the first node hosts a route to the virtual IP address after the detection of a failure indication associated with the primary workload comprises the first node broadcasting to the virtual logical network that the first node hosts a route to the virtual IP address at a predetermined minimum route cost, wherein performing the IP address failover procedure comprises:
    in response to the first node broadcasting to the virtual logical network that the first node hosts a route to the virtual IP address at the predetermined minimum route cost, the second node broadcasting to the virtual logical network that the second node no longer hosts a route to the virtual IP address.

6. The method of claim 5, wherein performing the IP address failover procedure comprises, in response to the second node broadcasting to the virtual logical network that the second node no longer hosts a route to the virtual IP address, the first node broadcasting an update to the virtual logical network in relation to the virtual IP address, the updated broadcast indicating that the first node hosts a route to the virtual IP address at the first route cost.

7. The method of claim 5, wherein the predetermined minimum route cost comprises a zero route cost.

8. The method of claim 1, wherein performing the IP address failover procedure comprises the first node broadcasting to the virtual logical network that the first node no longer hosts a route to the virtual IP address.

9. The method of claim 8, wherein performing the IP address failover procedure comprises the first node attempting to contact the primary workload,
    wherein the first node broadcasting to the virtual logical network that the first node no longer hosts a route to the virtual IP address is performed in response to the contact attempt by the first node failing to receive a response from the primary workload.

10. The method of claim 8, comprising, prior to the detection of a failure indication associated with the primary workload, the first node broadcasting to the virtual logical network that the first node hosts a route to the virtual IP address at a first route cost,
    wherein the second node broadcasts to the virtual logical network that the second node hosts a route to the virtual IP address at a second route cost, the second route cost being lower than the first route cost.

11. The method of claim 10, wherein performing the IP address failover procedure comprises, in response to the first node broadcasting to the virtual logical network that the first node no longer hosts a route to the virtual IP address, the second node broadcasting an update to the virtual logical network in relation to the virtual IP address, the updated broadcast indicating that the second node hosts a route to the virtual IP address at the first route cost.

12. The method of claim 8, wherein the first or second node broadcasting to the virtual logical network that the first or second node no longer hosts a route to the virtual IP address comprises the first or second node broadcasting to the virtual logical network using a Border Gateway Protocol (BGP) route revoke mechanism.

13. The method of claim 1, wherein performing the IP address failover procedure comprises:
   the first node attempting to contact the primary workload;
   in response to the contact attempt from the first node, the primary workload indicating to the first node that the virtual IP address can be reached at the primary workload; and
   the first node broadcasting to the virtual logical network that the first node hosts a route to the virtual IP address.

14. The method of claim 13, wherein the first node broadcasts to the virtual logical network that the first node hosts a route to the virtual IP address after the detection of a failure indication associated with the primary workload, and the first node broadcasts to the virtual logical network that the first node hosts a route to the virtual IP address at a third route cost, the third route cost being lower than the second route cost.

15. The method of claim 14, wherein performing the IP address failover procedure comprises:
   the second node attempting to contact the secondary workload;
   in response to the contact attempt from the second node, the secondary workload indicating to the second node that the virtual IP address can be reached at the secondary workload; and
   the second node broadcasting to the virtual logical network that the second node hosts a route to the virtual IP address at a fourth route cost, the fourth route cost being lower than the third route cost.

16. The method of claim 15, wherein performing the IP address failover procedure comprises the first node broadcasting to the virtual logical network that the first node no longer hosts a route to the virtual IP address.

17. The method of claim 16, wherein performing the IP address failover procedure comprises the first node further attempting to contact the primary workload,
   wherein the first node broadcasting to the virtual logical network that the first node no longer hosts a route to the virtual IP address is performed in response to the further contact attempt by the first node failing to receive a response from the primary workload.

18. The method of claim 16, wherein performing the IP address failover procedure comprises the first node further attempting to contact the primary workload,
   wherein the first node broadcasting to the virtual logical network that the first node no longer hosts a route to the virtual IP address is performed in response to the further contact attempt by the first node receiving a negative response from the primary workload.

19. The method of claim 16, wherein performing the IP address failover procedure comprises, in response to the first node broadcasting to the virtual logical network that the first node no longer hosts a route to the virtual IP address, the second node broadcasting an update to the virtual logical network in relation to the virtual IP address, the updated broadcast indicating that the second node hosts a route to the virtual IP address at the first route cost.

20. The method of claim 1, wherein the shared virtual IP address comprises a private IP address, the method comprising, at one of the first and second nodes:
   performing a static network address translation (NAT) to map the private IP address to an IP address in an external network; and
   broadcasting to the virtual logical network that the one of the first and second nodes hosts a route to the virtual IP address in the external network.

21. The method of claim 20, comprising, at the one of the first and second nodes, delaying the broadcasting to the external network that the one of the first and second nodes hosts a route to the virtual IP address in the external network until the IP address failover procedure has completed.

22. The method of claim 20, comprising, during the IP address failover procedure, at the one of the first and second nodes, forwarding packets to the other of the first and second nodes.

23. The method of claim 22, wherein the packets are forwarded using IP to IP tunneling.

24. The method of claim 20, wherein the external network comprises the public Internet and the virtual IP address in the external network comprises a public IP address.

25. The method of claim 1, wherein the primary workload and the secondary workload comprise one or more of:
   virtual machines,
   bare metal servers,
   containers, and
   service endpoints.

26. The method of claim 1, wherein the detection of a failure indication associated with the primary workload is detected via one or more of:
   the Address Resolution Protocol (ARP),
   gratuitous ARP messaging,
   Internet Control Message Protocol (ICMP) ping,
   Hypertext Transfer Protocol (HTTP) ping,
   a virtualisation watchdog,
   a liveness Application Program Interface (API), and
   an OPTIONS poll.

27. The method of claim 1, wherein at least one of the routes to an IP address hosted by a node in the plurality of network nodes is broadcast between the plurality of broadcast domains using the Border Gateway Protocol (BGP).

28. The method of claim 1, wherein at least one of the routes to an IP address hosted by a node in the plurality of network nodes is broadcast between the plurality of broadcast domains using a cloud management Application Program Interface (API).

29. The method of claim 28, wherein the cloud management API comprises the Amazon™ Elastic Compute Cloud (EC2) web service virtual IP address control API.

30. A system for use in a network comprising a plurality of network nodes located in a plurality of broadcast domains, the system comprising at least one memory including computer program code; and
   at least one processor in data communication with the at least one memory, wherein the at least one processor is configured to:
   configure the plurality of network nodes to form a virtual logical network over the plurality of broadcast domains, wherein the configuring the virtual logical network comprises configuring at least one of the nodes in the plurality of nodes to broadcast routes to Internet Protocol (IP) addresses hosted on nodes in the plurality of network nodes between nodes in the plurality of broadcast domains, wherein the configured virtual logical network comprises a virtual Layer 3 subnet;
   configure a primary workload hosted on a first node in the plurality of nodes to share ownership of a virtual IP address with a secondary workload hosted on a second node in the plurality of nodes, wherein the first node is located in a first broadcast domain in the plurality of broadcast domains and the second node is located in a second broadcast domain in the plurality of broadcast domains, the second broadcast domain being different from the first broadcast domain; and in response to detecting a failure indication associated with the primary workload, perform an IP address failover procedure for the shared virtual IP address between the primary workload and the secondary workload.

31. A non-transitory computer-readable storage medium comprising computer-executable instructions which, when executed by a processor, cause a computing device to perform a method for use in a network comprising a plurality of network nodes located in a plurality of broadcast domains, the method comprising:

configuring the plurality of network nodes to form a virtual logical network over the plurality of broadcast domains, wherein the configuring the virtual logical network comprises configuring at least one of the nodes in the plurality of nodes to broadcast routes to Internet Protocol (IP) addresses hosted on nodes in the plurality of network nodes between nodes in the plurality of broadcast domains, wherein the configured virtual logical network comprises a virtual Layer 3 subnet;

configuring a primary workload hosted on a first node in the plurality of nodes to share ownership of a virtual IP address with a secondary workload hosted on a second node in the plurality of nodes, wherein the first node is located in a first broadcast domain in the plurality of broadcast domains and the second node is located in a second broadcast domain in the plurality of broadcast domains, the second broadcast domain being different from the first broadcast domain; and in response to detecting a failure indication associated with the primary workload, performing an IP address failover procedure for the shared virtual IP address between the primary workload and the secondary workload.

* * * * *